United States Patent [19]

Cuisia et al.

[11] Patent Number: 4,847,001
[45] Date of Patent: Jul. 11, 1989

[54] CONTROL OF CORROSION IN AQUEOUS SYSTEMS

[75] Inventors: Dionisio G. Cuisia, Chicago; Chih M. Hwa, Palatine; Murrell L. Salutsky, Highland Park, all of Ill.

[73] Assignee: W. R. Grace & Co.-Conn., New York, N.Y.

[21] Appl. No.: 68,310

[22] Filed: Jul. 1, 1987

[51] Int. Cl.⁴ .................. C23F 11/10; B01D 19/00
[52] U.S. Cl. .................. 252/389.62; 252/188.28; 252/391; 422/16
[58] Field of Search ............ 252/188.28, 391, 389.62; 422/16

[56] References Cited

U.S. PATENT DOCUMENTS

| | | | |
|---|---|---|---|
| 2,170,596 | 8/1939 | Quiggle | 23/232 |
| 2,682,563 | 6/1954 | Bell et al. | 260/625 |
| 2,835,715 | 5/1958 | Tiede | 260/677 |
| 3,551,349 | 12/1970 | Kallfass | 252/392 |
| 3,764,548 | 10/1973 | Redmore | 252/8.55 |
| 3,843,547 | 10/1974 | Kaufman et al. | 252/184 |
| 3,983,048 | 9/1976 | Schiessl et al. | 252/178 |
| 4,026,664 | 5/1977 | Noack | 21/2.7 R |
| 4,067,690 | 1/1978 | Cuisia et al. | 21/2.7 R |
| 4,079,018 | 3/1978 | Noack | 252/389 R |
| 4,278,635 | 7/1981 | Kerst | 422/14 |
| 4,279,767 | 7/1981 | Muccitelli | 252/178 |
| 4,282,111 | 8/1981 | Ciuba | 252/178 |
| 4,289,645 | 9/1981 | Muccitelli | 252/178 |
| 4,337,225 | 6/1982 | Dines | 423/10 |
| 4,350,606 | 9/1982 | Cuisia et al. | 252/392 |
| 4,363,734 | 12/1982 | Slovinsky | 210/750 |
| 4,504,575 | 3/1985 | Lee | 430/531 |
| 4,513,007 | 4/1985 | de Courten et al. | 514/555 |

FOREIGN PATENT DOCUMENTS

| | | |
|---|---|---|
| 0039130 | 4/1981 | European Pat. Off. |
| 0044124 | 2/1982 | European Pat. Off. |
| 0054345 | 6/1982 | European Pat. Off. |
| 0161822 | 6/1985 | European Pat. Off. |
| 0165656 | 9/1985 | European Pat. Off. |
| 51-93741 | 8/1976 | Japan |
| 57-204288 | 12/1982 | Japan |
| 308974 | 3/1969 | Sweden |
| 296449 | 5/1972 | U.S.S.R. |
| 2084982A | 12/1982 | United Kingdom |
| 2157670A | 10/1985 | United Kingdom |

OTHER PUBLICATIONS

H. H. Uhlig et al.; "Corrosion and Corrosion Control"; p. 291, John Wiley & Sons, Inc. (1985).
Shaffer et al.; "Oxidation of Diethylhydroxylamine in Water Solution at 25°-85° C.", J. Phys. Chem. (1986) pp. 4408-4413.
Caceres et al.; "Autoxidation of Diethyl Hydroxylamine"; International Journal of Chemical Kinetics, vol. X, (1978) pp. 1167-1182.
Johnson et al.; "Aliphatic Hydroxylamines, Part II, Autoxidation" Journal of the Chemical Society, 1956, Part I, pp. 1093-1103.
Johnson et al.; "The Autoxidation of Aliphatic Hydroxylamines"; Chemistry & Industry (1953); pp. 1032-1033.
Green et al.; "The Influence of Hydroxyl Ion Concentration on the Autoxidation of Hydroquiame" Journal of the American Chemical Society; Dec. 17, 1941; vol. 63, No. 12, pp. 3441-3444.
Anonymous Research Disclosure #26668; "Potassium Hydroquinone Sulfonate Oxygen Scavenger for Use in Aqueous Systems"; Jun. 1986.
Encyclopedia of Chemical Technology, 2nd ed., vol. 11 (1966); "Hydroxylamine and Hydroxylamine Salt"; pp. 493-508.

Primary Examiner—John F. Terapane
Assistant Examiner—Gary Geist
Attorney, Agent, or Firm—David E. Heiser

[57] ABSTRACT

A method and composition for inhibiting the corrosion of metal surfaces in contact with the system water of aqueous systems are disclosed, which use a combination of at least one compound selected from 2,5 dihydroxybenzene sulfonic acid and its water soluble salts and at least one amine selected from neutralizing amines and hydroxylamines.

32 Claims, 1 Drawing Sheet

CONTROL OF CORROSION IN AQUEOUS SYSTEMS

FIELD OF THE INVENTION

This invention relates to the addition of oxygen scavengers to aqueous solutions to reduce the corrosion of metals that are in contact with the solutions, and more particularly, to the addition of hydroquinone-2-sulfonates in combination with an amine selected from the group consisting of neutralizing amines and hydroxylamines, to an aqueous system to promote oxygen scavenging so that corrosion of metal surfaces in contact with the system water is reduced.

BACKGROUND OF THE INVENTION

In processes using aqueous solutions, corrosion of metal surfaces may occur at various locations including feed lines, heaters, steam lines, process tanks and return lines. The presence of dissolved gases such as carbon dioxide and oxygen in the water can be a principal factor influencing this corrosion, particularly where iron and steel are materials of construction.

In boilers, carbonate or bicarbonate compounds are frequently added to make the feedwater alkaline. The materials can decompose at boiler operating conditions to produce carbon dioxide with the steam such that there is increased corrosion of steam lines and steam condensate return lines. Neutralizing amines react with carbon dioxide in the condensate and are well known in the boiler water condensate art as additives customarily used to reduce corrosion due to carbon dioxide. See e.g. H. H. Uhlig, et al. "Corrosion and Corrosion Control," page 291, John Wiley & Sons, Inc. (1985). The corrosion of the iron and steel pipes, boilers, and economizers of conventional boiler systems in oxygenated conditions is also a well known problem; and controlling the presence of oxygen in boiler systems, particularly in the feed water section, has received considerable attention. Oxygen removal may be partially accomplished by either vacuum or thermal deaeration, or both. Complete removal of oxygen cannot be effected by these means, however, and further removal by use of a chemical scavenging agent, such as sodium sulfite, is a well-known practice.

In recent times, the use of low pressure boilers (operating below about 150 psig) has been increasingly supplemented by use of boilers operating at moderate pressure (operating between about 150 psig and about 600 psig) and high pressure (operating above about 600 psig). As boiler operating temperatures and pressures have increased there has been particular interest in the performance of oxygen scavengers at these operating conditions. For example, use of sulphites at elevated temperatures and pressures may cause an increase in solids, and formation of sulfur dioxide and hydrogen sulfide, both of which can be a source of corrosion. Scavengers such as hydrazine, hydroquinone, and certain hydroxylamines have been found to perform satisfactorily in some circumstances. In other circumstances, the efficiency with which the scavenging proceeds has not been optimal. There is thus a continuing need for alternative oxygen scavengers which can be effectively used at elevated temperatures and pressures.

Despite the toxicity of hydrazine, much recent research has concerned development of corrosion inhibitors using hydrazine together with various organic products. U.S. Pat. No. 3,551,349 to Kallfass suggests using hydrazines in combination with activating amounts of various quinone compounds (including hydroxyl forms such as pyrocatechol and hydroquinone) and their derivatives, particularly those with hydrophilic substituents such as carboxylic acid and sulphonic acid. U.S. Pat. No. 3,843,547 to Kaufman et al. discloses a hydrazine-hydroxyl quinone combination in further combination with various aryl amine compounds. U.S. Pat. Nos. 4,026,664 and 4,079,018 to Noack disclose hydrazine-based corrosion inhibitors which use organometallic complexes (including those of sulfonated pyrocatechol and certain amino derivatives of carboxylic acids) as catalysts, and preferably, quinone compounds (including hydroquinone) and their derivatives (including sulfonic acid derivatives) to render the compositions compatible with phosphonate scale control agents.

Other work has focused on hydroxylamines. U.S. Pat. No. 4,067,690 of Cuisia et al. discloses that hydroxylamine and certain derivatives thereof are highly effective oxygen scavengers in boiler water. The hydroxylamines may be catalyzed with any of a number of well-known catalysts used in sodium sulfite or hydrazine boiler water treatment. Alkali metal hydroxide, water soluble metal salts, hydroquinone, and benzoquinone are also useful catalysts. As disclosed in U.S. Pat. No. 4,350,606 to Cuisia et al., the use of a hydroxylamine compound and a volatile, neutralizing amine such as cyclohexylamine, morpholine, diethylaminoethanol, dimethylpropanolamine, or 2-amino-2-methyl-1-propanol, inhibits corrosion in boiler systems caused by carbon dioxide and oxygen. Japanese Patent Document SHO 57-204288 to Sato discloses using certain hydroxylamines as de-oxidants in combination with certain trivalent phenols, napthoquinones, and anthraquinones or derivatives thereof (such as sodium 1,2 napthoquinone-4-sulfonate), as activating agents. The invention may be practiced in boiler related systems and activity is deemed particularly significant in neutral and alkaline pH ranges. U.K. Patent Application No. GB 2,157,670A by Nemes et al. reveals advantageous use of hydroxylamines together with neutralizing amines and a quinone, a dihydroxybenzene, a diaminobenzene, or an aminohydroxybenzene compound to scavenge oxygen and to inhibit corrosion in boiler water and other aqueous systems. The "quinone-benzene" component may comprise various sulphonated napthalenes.

Hydroquinone and some related compounds have also been used in corrosion inhibition. U.S. Pat. No. 4,278,635 to Kerst discloses use of various dihydroxy, diamino, and amino hydroxy benzenes and their lower alkyl substituted derivatives (including sulfonated napthalenes), and particularly hydroquinone, as deoxygenating corrosion control agents which compare favorably with other scavengers such as hydrazine. Reaction rate increases with higher pH and higher temperature are disclosed, as is use of the invention in boiler systems. U.S. Pat. Nos. 4,279,767 and 4,289,645 both to Muccitelli are directed to use of hydroquinone as an oxygen scavenger in combination with various compatible amines. Addition of hydroquinone to boiler feedwater together with certain neutralizing amines used to neutralize carbon dioxide in the boiler condensate system is disclosed. The systems preferably have elevated temperatures and/or alkaline conditions. U.S. Pat. No. 4,282,111 to Cuiba also relates to a method of reducing oxygen in aqueous, preferably alkaline medium, including boiler system water, using hydroquinone. Hydroquinone is shown to perform equal to or superior to hydrazine under various conditions. Kaufman and U.S. Pat. No. 4,363,734 to Slovinsky claim use of hydroquinone as a catalyst in combination with other oxygen scavengers, namely hydrazine and dihydroxy acetone, respectively. U.S. Pat. No. 3,764,548 to Redmore discloses an oxygen scavenging system using an anthraquinone disulfonic acid compound and a vanadate salt to catalyze reducing agents such as hydrogen sulfide or hydrazine. Japanese Patent Publication No. SHO 51-93741 by Sozuki et al. reports synergistic inhibition of metallic corrosion by combinations of dihydroxybenzenes (e.g. hydroquinone and methyl hydroquinone) and various carboxylic acids. Boiler water use is suggested. European Patent Publication No. 0039130 is directed to use of certain "dioxo" aromatic compounds (e.g. hydroquinone, benzoquinone, napthoquinone, catechol), including certain organically substituted derivatives thereof, as oxygen scavengers in aqueous medium, including boiler water. The "dioxo" scavengers are deemed to outperform hydrazine under certain conditions and are preferably used in alkaline pH.

European Patent Publication No. 0054345 is directed to use of certain aminophenol compounds to reduce oxygen in aqueous medium such as boiler water. These scavengers are deemed to outperform hydrazine in simulated feedwater conditions and are preferably used in alkaline pH.

Quinones, and substituted aromatics have found application in various arts. For example, U.S. Pat. No. 2,835,715 to Tiede identifies oxygen absorbing agents for certain process streams, including resorcinol, pyrogallol, phloroglucinol, quinone, hydroquinone, chlorohydroquinone, and tertiarybutylcatechol. Swedish Specification No. 308,974 discusses the use of sulfonated benzenes, hydroxy benzenes, naphthalenes, and related compounds in combination with phosphoric acid and amino acid for pickling and phosphatizing baths. U.S. Pat. No. 2,170,596 to Quiggle describes oxygen-absorbing solutions using catalysts such as various quinones (including sodium anthraquinone beta sulfonate and hydroquinone) together with reducing agents such as sulfides. Soviet Patent Publication No. 296,449 discloses use of sodium anthraquinone-2-sulfonic acid to protect titanium from acid corrosion. U.S. Pat. No. 2,682,563 to Bell et al. discusses use of propenyl derivatives of hydroquinone as antioxidants particularly valuable in protecting fats and oils. Synergists, including phosphoric acid and amino acids, are disclosed.

Hydroquinone-2-sulfonates are known chemicals, and have been used in diverse applications, including as a component of certain liquid membrane processes for removing uranium ions or the like from a fluid (see for example U.S. Pat. No. 4,337,225); as a reducing agent for preparing heat developable film (see for example U.S. Pat. No. 4,504,575); and as an agent for treating heart disease (see for example U.S. Pat. No. 4,513,007).

SUMMARY OF THE INVENTION

Addition of 2,5-dihydroxybenzene sulfonic acid ($C_6H_6O_5S$) and/or its water soluble salts together with either neutralizing amines or hydroxylamines, or both to the system water of aqueous systems, for example boiler system water, inhibits the corrosion of metal in contact with the system water by removing oxygen dissolved therein. The invention herein described surprisingly promotes the rapid scavenging of oxygen in aqueous systems, such as boiler water systems, containing dissolved air and/or oxygen. The invention is especially suited for aqueous systems such as boiler water systems consisting essentially of water containing dissolved oxygen. Indeed, the efficiency of oxygen scavenging achieved by using the combined additives, and the effectiveness of the additives at conditions found within boiler systems, makes boiler system use particularly advantageous.

Accordingly, it is an object of this invention to provide a method to inhibit corrosion of metals in contact with aqueous solutions.

It is another object of this invention to remove oxygen from boiler system water.

It is yet another object of this invention to inhibit carbon dioxide induced corrosion in boiler systems while achieving efficient oxygen scavenging.

These and other objects and advantages of the present invention will become apparent from the detailed description of the invention which follows.

DETAILED DESCRIPTION

Figure 1:
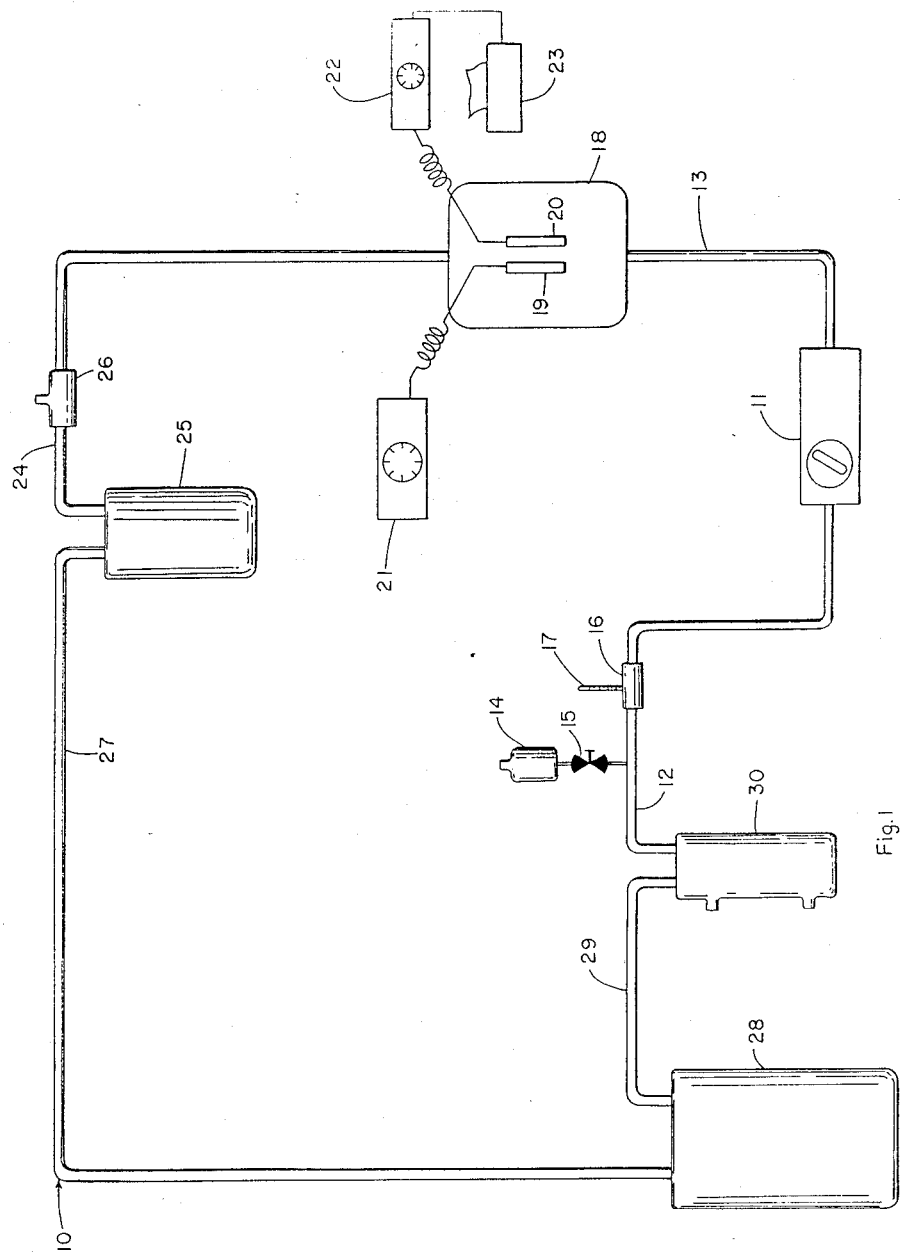
FIG. 1 is a schematic view of the apparatus used to test oxygen scavenging.

The corrosion inhibiting agents used in this invention include 2,5-dihydroxybenzene sulfonic acid having the structural formula:

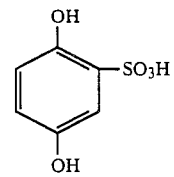

and/or its water soluble salts.

Metal salts of the sulfonate are preferred, with potassium and sodium being the preferred cations, potassium the most preferred. Accordingly, the preferred agents of this invention include potassium hydroquinone-2-sulfonate ($C_6H_5O_5SK$) having the general structural formula:

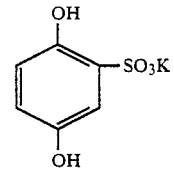

The structural formulae above are for identification only. Naturally, a sulfonate situated at any of the benzene carbons, excepting those bearing the hydroxyl groups, will yield an equivalent compound. The compounds (2,5-dihydroxybenzene sulfonic acid and its water soluble salts) and their equivalents will be referred to throughout this specification as "hydroquinone sulfonates."

We have found that use of hydroquinone sulfonates along with certain classes of amines, namely neutralizing amines and hydroxylamines, promotes oxygen scavenging even at moderate temperatures.

The use of hydroquinone sulfonate-amine combinations as oxygen scavengers may be practiced in various water systems, such as recirculating heating systems. However, they are particularly suited for use as oxygen scavenging additives to boiler related systems, such as, for example, boiler feedwater and boiler water. One suggested use is for treatment of water in a dormant boiler or boiler lay-up. In boiler water systems, corrosion may occur in feed lines, heaters, economizers, boilers, steam lines, and return lines; and the invention is intended for broad use in any boiler water system (i.e. at pressures in the range of 0 to 2000 psig or higher). Indeed, inasmuch as hydroquinone-sulfonate combinations are deemed to perform effectively at higher pressures and temperatures, they are considered particularly suited for boiler water systems operating at temperatures in the range of about 298° F. to about 706° F. and at pressures in the range of about 50 psig to 3200 psig. The metal surfaces exposed to these conditions are generally iron and steel.

Practice of the invention will become further apparent from the following non-limiting examples.

EXAMPLE I

The oxygen scavenging activity of potassium hydroquinone-2-sulfonate in combination with cyclohexylamine, a neutralizing amine, was evaluated in the test apparatus depicted schematically in FIG. 1. The apparatus (10) comprises a peristaltic pump (11) which is used for circulating water throughout the system, pump inlet tubing (12) and pump outlet tubing (13). A polyethylene fill-bottle (14) is connected with the inlet tubing (12) and is used to feed system water into the apparatus. A valve (15), which may be selectively opened and closed, is provided between the fill bottle (14) and the inlet tubing (12) and is used to control flow therebetween. A temperature measurement chamber (16) is positioned within the pump inlet tubing (12) and contains a thermometer (17) used for monitoring the water temperature. The system water is drawn through the inlet tubing (12), into the pump (11) and then is pumped via the pump outlet tubing (13) into a glass sampling chamber (18). The sampling chamber (18) contains a pH probe (19) and a dissolved oxygen probe (20). The pH probe (19) is operably connected to a pH meter (21) used for displaying and monitoring the system water pH; and the dissolved oxygen probe (20) is operably connected to a dissolved oxygen meter (22) used for displaying and monitoring the system water dissolved oxygen level, as well as to a recorder (23) used for continuously recording the dissolved oxygen level in the system water. Tubing (24) is provided for directing system water from the glass sampling chamber (18) to the one liter stainless steel preheat reactor (25), known in the laboratory as a "Parr vessel." A glass chemical inlet chamber (26) is positioned within the tubing (24) and may be fitted with a rubber septum (not shown) through which a chemical solution of oxygen scavenger may be injected. The preheat reactor (25) contains a heating element (not shown) which may be activated to preheat the system water. Water forced out of the preheat reactor (25) by operation of the pump (11) is directed through tubing (27) to a two liter stainless steel heating reactor (28) where the system water is heated to its highest temperature. A heating element and a thermostat (not shown) are provided for maintaining the water temperature in the heating reactor (28) relatively constant. The water from the heating reactor (28) passes through tubing (29) into water cooled heat exchanger (30) which cools the system water to a range of about 55° F. to 60° F. System water from the heat exchanger (30) is then recirculated into the pump inlet tubing (12). Thus, while the system water may be heated to elevated temperatures in the preheat reactor (25) and the heating reactor (28), the recirculated water passing through the pump and into the sampling chamber (18) may be kept at a relatively constant temperature conducive to accurate probe operation. The full capacity of the apparatus (10) is about 4.5 liters while the pumping rate of pump (11) is about 0.5 liter per minute.

The oxygen scavenging activity of potassium hydroquinone-2-sulfonate, cyclohexylamine, and a combination thereof were each investigated at system water conditions of 30° C. In each run, distilled water saturated with oxygen (about 8.5 ppm) and containing about 10 ppm carbon dioxide was fed into the system through the polyethylene fill bottle (14). The system was filled to its capacity with water to the substantial exclusion of air, and the water was heated, using only the heating reactor (28), until a steady state was achieved at which the temperature of system water leaving the heating reactor (28) as controlled by the thermostat therein was about 30° C., and the temperature of the system water leaving the heat exchanger as measured by thermometer (17) was from about 55° F. to 60° F. During this initial period, gas was allowed to exit from the system through the fill bottle (14) and the chemical inlet chamber (26); and the dissolved oxygen level in the circulating water was allowed to equilibrate. Recirculation continued in each run until the oxygen level in the system water remained constant for at least 30 minutes. Once the initial reading was established, the system was closed to the atmosphere and the composition to be evaluated as an oxygen scavenger was injected through the rubber septum fitted in the chemical inlet chamber (26). Recycling continued for 20 minutes, during which time the oxygen level in the sampling chamber (18) was monitored. The results of the three runs are given in Table I below. The dosage of potassium hydroquinone-2-sulfonate, where used, was 7 ppm per 1 ppm dissolved oxygen. The dosage of cyclohexylamine, where used, was 200 ppm.

TABLE I

| | Dissolved Oxygen Levels in ppm $O_2$, after adding | | |
|---|---|---|---|
| Time (Minutes) | Potassium Hydroquinone 2-Sulfonate (7 ppm per 1 ppm $O_2$) | Cyclohexyl-amine (200 ppm) | Cyclohexylamine (200 ppm) plus Potassium Hydroquinone-2-Sulfonate (7 ppm per 1 ppm $O_2$) |
| 0 | 6.6 | 6.9 | 6.9 |
| 5 | 6.6 | 6.9 | 1.8 |
| 10 | 6.6 | 6.9 | 1.4 |
| 15 | 6.6 | 6.9 | 1.3 |
| 20 | 6.6 | 6.9 | 1.3 |

The pH of the water prior to the addition of the additives was about 5.8.

EXAMPLE II

Another run was made in accordance with the procedure of Example I, and using a combination of hydroquinone-2-sulfonate and dietylaminoethanol, another neutralizing amine. The results of this run are given in Table II below.

TABLE II

| Time (Minutes) | Dissolved Oxygen Levels in ppm O₂, after adding Diethylaminoethanol (200 ppm) plus Potassium Hydroquinone-2-Sulfonate (7 ppm per 1 ppm O₂) |
| --- | --- |
| 0 | 6.6 |
| 5 | 3.9 |
| 10 | 1.8 |
| 15 | 1.4 |
| 20 | 1.2 |

EXAMPLE III

A run performed in accordance with the procedure of Example I, and using a combination of hydroquinone-2-sulfonate and morpholine, a neutralizing amine. The results of this run are shown in Table III below.

TABLE III

| Time (Minutes) | Dissolved Oxygen Levels in ppm O₂, after adding Morpholine (200 ppm) plus Potassium Hydroquinone-2-Sulfonate (7 ppm per 1 ppm O₂) |
| --- | --- |
| 0 | 6.5 |
| 5 | 5.9 |
| 10 | 5.0 |
| 15 | 4.3 |
| 20 | 4.2 |

EXAMPLE IV

Another test was made in accordance with the procedure of Example I, and using a combination of hydroquinone-2-sulfonate and 2-amino-2-methyl-1-propanol, another neutralizing amine. The test results are given in Table IV below. The dosage of potassium hydroquinone-2-sulfonate, where used, was 14 ppm per 1 ppm dissolved oxygen. The dosage of 2-amino-2-methyl-1-propanol, where used, was 200 ppm.

TABLE IV

| Time (Minutes) | Dissolved Oxygen Levels in ppm O₂, after adding | |
| --- | --- | --- |
| | Potassium Hydroquinone 2-Sulfonate (14 ppm per 1 ppm O₂) | 2-Amino-2-Methyl-1-Propanol (200 ppm) plus Potassium Hydroquinone-2-Sulfonate (14 ppm per 1 ppm O₂) |
| 0 | 6.1 | 6.6 |
| 5 | 6.1 | 2.6 |
| 10 | 6.1 | 1.4 |
| 15 | 6.1 | 1.2 |
| 20 | 6.1 | 1.0 |

EXAMPLE V

A run was conducted in accordance with the procedure of Example I, and employing a combination of hydroquinone-2-sulfonate and dimethylpropanolamine, a neutralizing amine. The results of this run are illustrated in Table V below.

TABLE V

| Time (Minutes) | Dissolved Oxygen Levels in ppm O₂, after adding Dimethylpropanolamine (200 ppm) plus Potassium Hydroquinone-2-Sulfonate (14 ppm per 1 ppm O₂) |
| --- | --- |
| 0 | 6.9 |
| 5 | 4.7 |
| 10 | 3.4 |
| 15 | 2.9 |

TABLE V-continued

| Time (Minutes) | Dissolved Oxygen Levels in ppm O₂, after adding Dimethylpropanolamine (200 ppm) plus Potassium Hydroquinone-2-Sulfonate (14 ppm per 1 ppm O₂) |
| --- | --- |
| 20 | 2.7 |

EXAMPLE VI

Another test was performed in accordance with the procedure of Example I, and using a combination of hydroquinone-2-sulfonate, cyclohexylamine, and dietylaminoethanol. The results of this test are given in Table VI below.

TABLE VI

| Time (Minutes) | Dissolved Oxygen Levels in ppm O₂, after adding Cyclohexylamine (100 ppm), Diethylaminoethanol (100 ppm), plus Potassium Hydroquinone-2-Sulfonate (14 ppm per 1 ppm O₂) |
| --- | --- |
| 0 | 6.3 |
| 5 | 1.3 |
| 10 | 0.8 |
| 15 | 0.7 |
| 20 | 0.6 |

It is evident from Tables I–VI that the combinations of potassium hydroquinone-2-sulfonate and neutralizing amines were surprisingly effective. Indeed, neither neutralizing amine alone, nor potassium hydroquinone-2-sulfonate alone, appeared to be effective oxygen scavengers. While the exact mechanism of the scavenging reaction achieved by the combination of hydroquinone sulfonates and neutralizing amines is not certain, it is believed that the neutralizing amines provide a catalytic effect in the reaction of hydroquinone sulfonates with oxygen, making the removal of oxygen faster, even at relatively low temperature. Preferred neutralizing amines for use in this invention include, in addition to cyclohexylamine and diethylaminoethanol, morpholine, dimethylpropanolamine, methoxypropylamine, and 2-amino-2-methyl-1-propanol.

In addition to inhibiting corrosion due to oxygen, the presence of neutralizing amines will provide protection against carbon dioxide induced corrosion.

The amounts of neutralizing amines and hydroquinone sulfonates used for treating any particular aqueous system can vary considerably according to such factors as the amount of oxygen and carbon dioxide in the system and the exposure of the system to atmospheric oxygen. The amounts of neutralizing amines and hydroquinone sulfonate used are those effective to promote substantially more rapid oxygen scavenging than that provided by either component alone. Generally, for the neutralizing amine and the hydroquinone sulfonate to effectively interact in accordance with this invention, the weight ratio of neutralizing amine to hydroquinone sulfonate added to the system water is between about 0.1:1 and 100:1, preferably from about 0.5:1 to about 50:1, and especially from about 1:1 about 20:1. Where the neutralizing amine and hydroquinone sulfonate are added as the sole oxygen scavenger, the combined amount of neutralizing amine and hydroquinone sulfonate added to the system is generally between about 0.01 parts per million (ppm) and about 5,000 ppm; preferably from about 1 ppm to about 600 ppm; and especially from about 5 ppm to about 300 ppm.

EXAMPLE VII

The oxygen scavenging activity of diethylhydroxylamine, both alone and in combination with potassium hydroquinone-2-sulfonate, was evaluated in accordance with the procedure of Example I. The results of these runs are presented in Table VII below. The dosages used in these tests were 7 ppm of scavenger composition per 1 ppm $O_2$ (by weight). The weight ratio of diethylhydroxylamine to potassium hydroquinone-2-sulfonate in the combination was 9:1.

TABLE VII

| | Dissolved Oxygen Levels in ppm $O_2$, after adding | | |
|---|---|---|---|
| Time (Minutes) | Potassium Hydroquinone 2-Sulfonate (7 ppm per 1 ppm $O_2$) | Diethyl- hydroxyl- amine (7 ppm per 1 ppm $O_2$) | Diethylhydroxylamine plus Potassium Hydro- quinone-2-Sulfonate (9:1, 7 ppm per 1 ppm $O_2$) |
| 0 | 6.6 | 7.0 | 7.3 |
| 5 | 6.6 | 5.5 | 4.7 |
| 10 | 6.6 | 5.2 | 2.3 |
| 15 | 6.6 | 5.2 | 1.7 |
| 20 | 6.6 | 5.2 | 1.7 |

The pH in these runs was about 8.5.

It is evident from Table VII that the combination of potassium hydroquinone-2-sulfonate and the hydroxylamine was surprisingly effective. The exact mechanism of the scavenging reaction achieved by this combination is not certain. However, because of the relatively small amount of hydroquinone sulfonate used, it is believed that the hydroquinone sulfonates provide a catalytic effect in the reaction of hydroxylamines with oxygen, making the removal of oxygen faster, even at relatively low temperatures. Preferred hydroxylamines include diethylhydroxylamine and hydroxylamine itself ($NH_2OH$).

The amounts of hydroxylamines and hydroquinone sulfonates used for treating any particular aqueous system can also vary considerably according to such factors as the amount of oxygen in the system, and exposure of the system to atmosphere oxygen. The amounts of hydroxylamines and hydroquinone sulfonate used are those effective to promote substantially more rapid oxygen scavenging than provided by either component alone. Generally, for the hydroxylamine and the hydroquinone sulfonate to effectively interact in accordance with this invention, the weight ratio of hydroxylamine to hydroquinone sulfonate added to the system water is between about 0.01:1 and 500:1; preferably from about 0.1:1 to about 100:1; and especially from about 0.3:1 to about 20:1. Where the hydroxylamine and hydroquinone sulfonate are added as the sole oxygen scavenger, the combined amount of hydroxylamine and hydroquinone sulfonate added to the system is generally between about 0.01 ppm and 3,000 ppm; preferably from about 1 ppm to about 500 ppm; and especially from about 2 ppm to about 250 ppm.

Hydroxylamines preferred for use in this invention include those having the general formula:

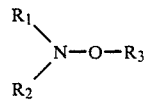

in which $R_1$, $R_2$ and $R_3$ are the same or different and are selected from the group consisting of hydrogen, lower alkyl, and aryl; and water soluble salts of these hydroxylamines. The lower alkyl group may generally have from 1 to 8 carbon atoms and the aryl group may be, for example, phenyl, benzyl, and tolyl. Suitable hydroxylamine compounds include hydroxylamine; N,N-diethylhydroxylamine; hydroxylamine hydrochloride; hydroxylammonium acid sulfate; hydroxylamine phosphate; N-ethylhydroxylamine; N-isopropylhydroxylamine; N,N-dimethylhydroxylamine; O-methylhydroxylamine; N-hexylhydroxylamine; O-hexylhydroxylamine; N-heptylhydroxylamine: N,N-dipropylhydroxylamine; O-methyl N,N-diethylhydroxylamine;N-octylhydroxylamine; O-ethyl N,N-dimethylhydroxylamine; N,N-diethylhydroxylamine hydrochloride; N-methyl-N-ethylhydroxylamine; O-methyl N-propylhydroxylamine; N-methyl N-propylhydroxylamine; O-methylhydroxylamine phosphate; N-butylhydroxylamine; O-pentylhydroxylamine; N-benzylhydroxylamine; O-benzylhydroxylamine; and N,N-diethylhydroxylamine acetate. N,N-diethylhydroxylamine, hydroxylamine, hydroxylamine hydrochloride, and hydroxylammonium acid sulfate are preferred and N,N-diethylhydroxylamine is especially preferred. Also suitable for use in this invention are compounds, which upon being added to the aqueous system, yield hydroxylamines.

EXAMPLE VIII

For comparison, the scavenging effectiveness of hydrazine was also evaluated at pH of about 8.5 using the method of Example I. The results of this run are presented in Table VIII below. The dosage used in this test was about 3 ppm per 1 ppm $O_2$.

TABLE VIII

| Dissolved Oxygen Levels in ppm $O_2$, after adding | |
|---|---|
| Time (Minutes) | Hydrazine |
| 0 | 6.6 |
| 5 | 6.6 |
| 10 | 6.4 |
| 15 | 6.4 |
| 20 | 6.3 |

It is evident that the use of the hydroquinone sulfonate in combination with hydroxylamine provided comparatively more rapid scavenging than hydrazine.

EXAMPLE IX

To test the suitability of using diethylhydroxylamine salt of hydroquinone-2-sulfonic acid at boiler feedwater conditions, runs using this additive were made using the apparatus described in Example I, but heating the water via the preheat reactor (25) and the heating reactor (28) to about 190° F. Monitoring of dissolved oxygen was continued for 30 minutes following the addition of the additive. The results for diethylhydroxylamine salt of hydroquinone-2-sulfonic acid, along with those for potassium hydroquinone-2-sulfonate and diethylhydroxylamine, at a pH of 8.5, are given in Table IX.

TABLE IX

| | Dissolved Oxygen Levels in ppm $O_2$, after adding | | | |
|---|---|---|---|---|
| | Potassium Hydroquinone- 2-Sulfonate | Diethyl- hydroxylamine | Diethylhydroxylamine Salt of Hydroquinone- 2-Sulfonic Acid | |
| Time (Minutes) | 2 moles per mole $O_2$ | 2.5 moles per mole $O_2$ | 0.8 moles per mole $O_2$ | 1.6 moles per mole $O_2$ |
| 0 | 4.7 | 3.7 | 5.5 | 4.0 |
| 5 | 3.6 | 3.0 | 4.0 | 3.1 |

TABLE IX-continued

| | Dissolved Oxygen Levels in ppm $O_2$, after adding | | | |
|---|---|---|---|---|
| | Potassium Hydroquinone-2-Sulfonate | Diethyl-hydroxylamine | Diethylhydroxylamine Salt of Hydroquinone-2-Sulfonic Acid | |
| Time (Minutes) | 2 moles per mole $O_2$ | 2.5 moles per mole $O_2$ | 0.8 moles per mole $O_2$ | 1.6 moles per mole $O_2$ |
| 10 | 3.0 | 2.4 | 2.3 | 1.2 |
| 15 | 2.8 | 2.2 | 1.3 | 0.7 |
| 20 | 2.3 | 1.8 | 1.2 | 0.6 |
| 30 | 2.2 | 1.4 | 1.1 | 0.5 |

It is evident from Table IX that diethylhydroxylamine salt of hydroquinone-2-sulfonic acid is an effective oxygen scavenger at relatively high temperatures.

EXAMPLE X

For comparison, the oxygen scavenging effectiveness of hydrazine was evaluated at a pH of 8.5 using the method of Example IX. The result of this test are presented in Table X below. The dosage used in this test was 2 moles of hydrazine per mole oxygen.

TABLE X

| Dissolved Oxygen Levels in ppm $O_2$, after adding | |
|---|---|
| Time (Minutes) | Hydrazine |
| 0 | 3.3 |
| 5 | 2.9 |
| 10 | 2.6 |
| 15 | 2.4 |
| 20 | 2.2 |
| 30 | 1.9 |

It is apparent that the use of the diethylhydroxylamine salt of hydroquinone-2-sulfonic acid provided comparatively more rapid scavenging of oxygen than hydrazine on a mole for mole basis.

The process of this invention for inhibiting corrosion of metal surfaces in contact with the system water of an aqueous system by scavenging oxygen from the system water comprises adding in the aqueous solution effective amounts of at least one hydroquinone sulfonate with at least one amine selected from the group consisting of neutralizing amines and hydroxylamines. However, hydroquinone sulfonates may be added in accordance with this invention in combination with both neutralizing amines and hydroxylamines. This embodiment is considered particularly effective in providing rapid oxygen scavenging; and it also generally provides protection against carbon dioxide induced corrosion. When hydroquinone sulfonate is added with both neutralizing amine and hydroxylamine, the preferred total dosage range for all components is generally from about 0.01 ppm to about 8,000 ppm, with the most preferred dosage range being generally from about 2 ppm to about 300 ppm.

As noted above, preferred salts of 2,5-dihydroxybenzene sulfonic acid include metal salts of the sulfonate, with potassium and sodium being the preferred cations, potassium the most preferred. Another preferred group of salts are the hydroxylamine salts of 2,5-dihydroxybenzene sulfonic acid, and the neutralizing amine salts of 2,5-dihydroxybenzene sulfonic acid. These salts can advantageously provide both the hydroquinone sulfonate and amine components of the instant invention.

Use of the combination scavengers of this invention is not confined to low, moderate or high pressure boiler systems, but may be utilized in a wide variety of other systems where aqueous solutions containing dissolved air and/or oxygen are in contact with metal surfaces. The precise dosage used in each system will be somewhat dependent on the particular system and the water characteristics therein. The preferred system water (which may contain small amounts of certain additives normally used in systems such as boiler water systems for control of corrosion, scaling, sedimentation, pH, hardness and the like) consists essentially of water containing dissolved oxygen. In systems where addition is made to an aqueous solution which will not be further aerated before it contacts the metal surfaces to be protected, a weight ratio of the oxygen scavenger component (i.e. the hydroquinone sulfonate plus the hydroxylamine) to oxygen dissolved in the aqueous solution is preferably between about 0.1:1 to about 100:1; most preferably between about 1:1 and about 20:1. The use of hydroquinone sulfonate in combination with neutralizing amines and/or hydroxylamines, and especially in combination with neutralizing amines, provides scavenging at relatively low pH and temperature conditions. It is generally economical, however, especially where the systems are not operated at elevated temperatures, that the system water have a pH greater than about 7 as oxygen scavenging proceeds; preferably between about 8.5 and about 12.0; most preferably from about 9 to about 11. The system water temperature preferably reaches at least about 60° F. during oxygen scavenging, for example, a range of about 60° F. to about 706° F. Most preferably, the scavengers are used in systems where the water temperature reaches the range of about 80° F. to about 490° F. during oxygen scavenging. Boiler feedwater is generally also treated with alkali, which may be introduced separately or in combination with the oxygen scavenger to provide a suitable alkaline pH.

The components may be added separately or in the form of a composition, at any location,, where they will be effectively mixed with the system water being treated.

In accordance with this invention, corrosion inhibiting compositions can be prepared which comprise a hydroquinone sulfonate and at least one amine selected from the group consisting of neutralizing amines and hydroxylamines. The compositions can, of course, contain both a neutralizing amine and a hydroxylamine. Suitable weight ratios of amines to the hydroquinone sulfonate in the compositions of the invention are generally the same as those described above as suitable for use in the process.

The compositions employed in the process of this invention can typically be added to the system water by feeding the treatment compounds as an aqueous feed solution. Feed solutions, when used, preferably contain 1 to 60 percent by weight of the combination; most preferably 5 to 40 weight percent thereof. Where, as in many boiler systems, make-up water is added to the aqueous solution, calibrated injectors can be employed to deliver predetermined amounts of the combination, periodically or continuously, to the aqueous solution via the make-up water line. While the scavengers may be added at locations throughout the system, the addition is preferably made at a location where there is little opportunity for additional aeration of the solution before it contacts the metal components to be protected. For example, in boiler systems, addition is preferably made to the feedwater at a location where the feedwater will not be exposed to substantial aeration before it enters the boiler. Examples of such locations might include the storage section of the deaerator, the feedwater line itself, or depending upon the boiler system design, through return condensate lines or make-up water lines.

The examples describe particular embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method of inhibiting the corrosion of metal surfaces in contact with the system water of an aqueous system wherein oxygen is present in the system water, comprising adding to the system water as an oxygen scavenger
   (a) at least one compound selected from the group consisting of 2,5-dihydroxybenzene sulfonic acid and its water soluble salts; and
   (b) at least one hydroxylamine selected from the group consisting of diethylhydroxylamine and water soluble salts thereof; the 2,5-dihydroxybenzene sulfonic acid component and the hydroxylamine component being added to the system water in a weight ratio of hydroxylamine component to 2,5-dihydroxybenzene sulfonic acid component of between about 0.01:1 and 500:1, and in amounts effective for said components to interact to promote more rapid oxygen scavenging.

2. The method of claim 1 wherein the weight ratio of component (b) to component (a) is from about 0.3:1 to about 20:1.

3. The method of claim 1 wherein component (a) and component (b) are added as the sole oxygen scavenger, and the combined amount of component (a) and component (b) added is between about 0.01 ppm and about 3,000 ppm.

4. The method of claim 3 wherein addition is made to system water which will not be further aerated before it contacts the metal surfaces, and wherein the combined weight ratio of component (a) and component (b) to oxygen dissolved in the system water is from about 0.1:1 to about 100:1.

5. The method of claim 3 wherein the pH of the system water is maintained above 7.

6. The method of claim 5 wherein the temperature of the system water reaches the range of about 60° F. to about 706° F. as the scavenging proceeds.

7. The method of claim 2 wherein a neutralizing amine is added to the system water in a weight ratio to component (a) of from about 0.1:1 to about 100:1.

8. The method of claim 7 wherein the combined amount of neutralizing amine, component (a) and component (b) added is between about 0.01 ppm and about 8,000 ppm.

9. The method of claim 7 wherein the neutralizing amine is selected from the group consisting of cyclohexylamine, diethylaminoethanol, morpholine, dimethylpropanolamine, methoxypropylamine, and 2-amino-2-methyl-1-propanol.

10. The method of claim 1 wherein a hydroxylamine salt of 2,5-dihydroxybenzene sulfonic acid is added.

11. The method of claim 1 wherein diethylhydroxylamine salt of 2,5-dihydromybenzene sulfonic acid is added.

12. The method of claim 1 wherein the pH of the system water is maintained above 7.

13. The method of claim 1 particularly adapted for use in boiler systems operating between about 50 psig and 3200 psig pressure and temperatures between about 298° F. and 706° F. to protect the iron and steel boiler system components in contact with the boiler water, wherein the oxygen scavenger is added to the boiler water.

14. The method of claim 1 wherein component (a) comprises a metal salt of the sulfonate.

15. A method of inhibiting the corrosion of metal surfaces in contact with the system water of an aqueous system wherein oxygen is present in the system water, comprising adding to the system water as an oxygen scavenger
   (a) at least one compound selected from the group consisting of 2,5-dihydroxybenzene sulfonic acid and its water soluble salts; and
   (b) cyclohexylamine; the 2,5-dihydroxybenzene sulfonic acid component and the cyclohexylamine component being added to the system water in a weight ratio of cyclohexylamine component to 2,5-dihydroxybenzene sulfonic acid component of between about 0.1:1 and 100:1, and in amounts effective for said components to interact to promote more rapid oxygen scavenging.

16. The method of claim 15 wherein the weight ratio of component (b) to component (a) is from about 0.5:1 to about 50:1.

17. The method of claim 15 wherein component (a) is added together with cyclohexylamine as the sole oxygen scavenger, and the combined amount of component (a) and cyclohexylamine added is between about 0.01 ppm and about 5,000 ppm.

18. The method of claim 17 wherein addition is made to system water will not be further aerated before it contacts the metal surfaces; and wherein the weight ratio of component (a) to oxygen dissolved in the system water is from about 0.1:1 to about 100:1.

19. The method of claim 17 wherein the pH of the system water is maintained above 7.

20. The method of claim 19 wherein the temperature of the system water reaches the range of about 60° F. to about 706° F. as the scavenging proceeds.

21. The method of claim 15 wherein a neutralizing amine salt of 2,5-dihyroxy-benzene sulfonic acid is added.

22. The method of claim 15 wherein a hydroxylamine is also added to the system water.

23. The method of claim 15 particularly adapted for use in boiler systems operating between about 50 psig and 3200 psig pressure and temperature between about 298° F. and 706° F. to protect the iron and steel boiler system components in contact with the boiler water, wherein the oxygen scavenger is added to the boiler water.

24. A composition suitable for addition to an aqueous solution to inhibit the corrosion of metal surfaces in contact therewith by scavenging oxygen, comprising:
   (a) at least one compound selected from the group consisting of 2,5-dihydroxybenzene sulfonic acid and its water soluble salts; and (b)
- (i) cyclohexylamine, the weight ratio of the cyclohexylamine component to the 2,5-dihydroxybenzene sulfonic acid component being between about 0.1:1 and 100:1; or
- (ii) at least one hydroxylamine selected from the group consisting of diethylhydroxylamine and water soluble salts thereof, the weight ratio of the hydroxylamine component to the 2,5-dihydroxybenzene sulfonic acid component being between about 0.001:1 and 500:1; or
- (iii) both (i) and (ii).

25. The composition of claim 24 wherein component (b) comprises said hydroxylamine compounds and wherein the weight ratio of said hydroxylamine to component (a) is from about 0.01:1 to about 500:1.

26. The composition of claim 25 wherein component (b) is diehhylhydroxylamine.

27. The composition of claim 25 further comprising a neutralizing amine in a weight ratio to component (a) of from about 0.1:1 to about 100:1.

28. The composition of claim 27 wherein said neutralizing amine is selected from the group consisting of cyclohexylamine, diethylaminoethanol, morpholine, dimethylpropanolamine, methoxypropylamine, and 2-amino-2-methyl-propanol.

29. The composition of claim 24 wherein component (a) comprises a metals salt of the sulfonate.

30. The composition of claim 29 wherein component (a) comprises potassium hydroquinone-2-sulfonate.

31. The composition of claim 24 wherein component (b) comprises cyclohexylamine; and wherein the weight ratio of cyclohexylamine to component (a) is from about 0.1:1 to about 100:1.

32. The composition of claim 31 further comprising a hydroxylamine.

* * * * *